United States Patent Office 3,420,838
Patented Jan. 7, 1969

3,420,838
2,3-BIS[p-(ω-AMINOALKOXY)PHENYL]-INDOLES
Jacob Szmuszkovicz, Kalamazoo, Mich., assigngor to The Upjohn Company, Kalamazoo, Mich., a corporation of Delaware
No Drawing. Filed Dec. 20, 1965, Ser. No. 515,184
U.S. Cl. 260—294.7  5 Claims
Int. Cl. C07d 57/00; C07d 27/56

ABSTRACT OF THE DISCLOSURE 2,3-bis[p-(ω-aminoalkoxy)phenyl] indoles, the acid addition salts thereof as well as a process for the production thereof are disclosed. These compounds are anti-inflammatory agents which can be orally, parenterally or rectally administered. The products are also useful as intermediates for mothproofing agents, pickling inhibitors and herbicides.

This invention relates to novel compounds and is more particularly concerned with novel 2,3-bis[p-(ω-aminoalkoxy)-phenyl]indoles (I), acid addition salts thereof, particularly the pharmacologically acceptable acid addition salts, novel intermediates (II) therefor, and a process for the production thereof.

The novel 2,3 - bis[p-(ω-aminoalkoxy)phenyl]indoles can be illustratively represented by the Formula I:

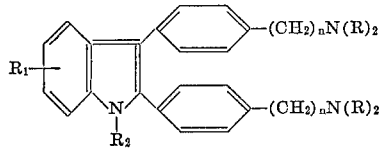

wherein $R_1$ is selected from the group consisting of hydrogen, fluorine, chlorine, bromine, iodine, alkyl having from 1 to 3 carbon atoms, inclusive, and alkoxy having from 1 to 3 carbon atoms, inclusive; wherein $R_2$ is selected from the group consisting of hydrogen, methyl, formyl, and

in which the alkyl group has from 1 to 3 carbon atoms, inclusive; wherein n is selected from the group of numbers consisting of 2 and 3; and wherein the radical —$N(R)_2$ is selected from the group consisting of dialkylamino, in which the alkyl groups having from 1 to 3 carbon atoms, inclusive, pyrrolidino, piperidino, alkylpyrrolidino, alkylpiperidino, dialkylpyrrolidino, and dialkylpiperidino in which the alkyl groups have from 1 to 3 carbon atoms, inclusive.

The novel intermediates are represented by the Formula II:

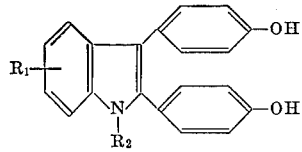

wherein $R_1$ and $R_2$ are defined as above, with the proviso that when $R_1$ is alkoxy, defined as above, $R_2$ is selected from the group consisting of hydrogen and methyl.

The novel 2,3-bis[p-(ω-aminoalkoxy)phenyl]indoles of Formula I are amines, and exist in the nonprotonated or free base form, or in the protonated or acid addition salt form depending on the pH of the environment. They form stable protonates, i.e., acid addition salts, on neutralization with acids, for example, hydrochloric, hydrobromic, sulfuric, phosphoric, nitric, acetic, benzoic, salicylic, glycolic, succinic, nicotinic, tartaric, maleic, pamoic, methane-sulfonic, cyclohexanesulfamic, picric, citric and latic acids, and the like. These acid addition salts are useful for upgrading the free bases.

Examples of alkyl having from 1 to 3 carbon atoms, inclusive, are methyl, ethyl, propyl, and isopropyl. Examples of alkoxy having from 1 to 3 carbon atoms, inclusive, are methoxy, ethoxy, propoxy and isopropoxy. Examples of

in which the alkyl group has from 1 to 3 carbon atoms, inclusive, are acetyl, propionyl, butyryl, and isobutyryl. Examples of dialkylamino in which the alkll groups have from 1 to 3 carbon atoms, inclusive, are dimethylamino, diethylamino, dipropylamino, diisopropylamino, ethylmethylamino, and the like. Examples of alkylpyrrolidino, alkylpiperidino, dialkylpyrrolidino, and dialkylpiperidino in which the alkyl groups have from 1 to 3 carbon atoms, inclusive, are 2-methylpyrrolidino, 3-methyl-pyrrolidino, 2-ethylpyrrolidino, 2-isopropylpyrrolidino, 2,2-dimethylpyrrolidino, 3,4-dimethylpyrrolidino, 2-methylpiperidino, 3-methlylpiperidino, 4-methylpiperidino, 2-propylpiperidino, 3,4-dimethylpiperidino, 4,4-dimethylpiperidino, 2-ethyl-6-methyl-piperidino, and the like.

The compounds of Formula I are generally prepared by reacting the compounds of Formula II with a reactant of the formula:

$$X—(CH_2)_n—N(R)_2$$

wherein n and —$N(R)_2$ are defined as above and wherein X is a halogen selected from the group consisting of chlorine and bromine in the presence of a strong base, e.g., sodium hydride.

If a compound of Formula I is desired in which $R_1$ is alkoxy and $R_2$ is formyl or

defined as above, a compound of Formula I, wherein $R_1$=alkoxy and $R_2$—hydrogen, is prepared in the manner described above, and the resulting product is acylated as shown in the examples.

The compounds of Formula II are generally prepared by treating compounds of the Formula III:

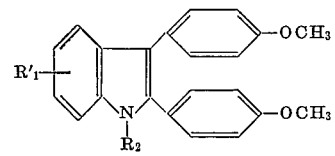

wherein $R_2$ is defined as above, and $R'_1$ is selected from the group consisting of hydrogen, fluorine, chlorine, bromine, iodine, and alkyl having from 1 to 3 carbon atoms, inclusive, with a Lewis acid, more particularly with aluminum chloride or bromide to obtain the corresponding substituted compounds of Formula II.

Another general method to prepare the compounds of Formula II, which is here particularly used when $R_1$ in Compound II is desired to be alkoxy, is the well-known Fisher indole synthesis; namely the reaction of an alkoxy-substituted phenylhydrazine (IV) with 4,4′-dihydroxydeoxybenzoin (V) in the presence of an acid:

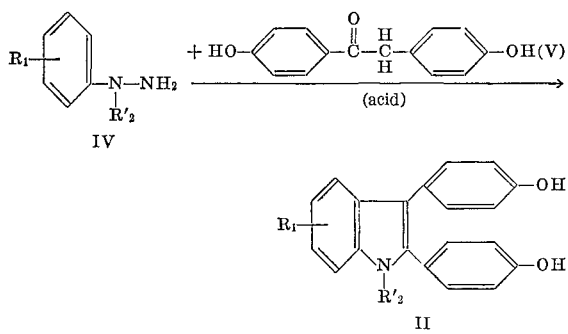

wherein R′₂ is selected from the group consisting of hydrogen and methyl. Details of this reaction are in the examples.

The compounds of Formula I of the present invention are anti-inflammatory, analgesic and antipyretic agents useful in birds and mammals, such as domestic animals, dogs, cats and farm animals, cattle, pigs and sheep, and also humans. The compounds can be administered topically, orally and parenterally for the relief of rheumatic, allergic, dermatological and ocular conditions generally responsive to anti-inflammatory agents, and for the relief of pain and fever.

More specifically, the Compound I of the present invention are useful for the reduction of swelling in gouty arthritis, rheumatoid arthritis, rheumatoid spondylitis, osteoarthritis, psoriatic arthritis, acute superficial thrombophlebitis and bursitis, and acute shoulder arthritis as well as contact dermatitis, atopic dermatitis, neurodermatitis, anogenital pruritus, seborrheic dermatitis, and the like, and for the relief of pain and fever.

The novel compounds in the form of pharmaceutical compositions also find application in the local treatment of inflammatory conditions in animal mastitis, a disease of the mammary glands which can be of particular concern in milk-producing animals such as cows.

The new compounds of Formula I can be used in pharmaceutical formulations which include topical, oral, parenteral and rectal uses. Examples of suitable oral formulations are tablets, capsules, pills, powder packets, wafers, cachets, granules, syrups, and the like. For parenteral use, injectable solutions and suspensions can be prepared, and for topical use the novel compounds can be incorporated into suitable ointment bases, creams, lotions, jellies, suppositories, bougies and the like.

For topical administration, ointments containing from 2.5 to 10 percent of the active compound of Formula I in an ointment base such as lanolin, Vaseline, light liquid petrolatum, polyethylene glycols and mixtures of these and the like are prepared. For oral use, tablets, pills or capsules containing from 100 to 500 mg. of the active compound of Formula I are prepared and are administered 2 to 4 times per day.

The new compounds of Formula I moreover can be used in the form of acid addition salts with mineral and organic acids, for example, as hydrochlorides, citrates, sulfates, tartrates and so on.

The fluosilicates of these compounds (I) form useful mothproofing agents as described in U.S. Patents 1,915,334 and 2,075,359. The thiocyanic acid addition salts of the compounds of Formula I, when condensed with formaldehyde, form resinous polymers which according to U.S. Patents 2,425,320 and 2,606,155 are useful as pickling inhibitors. The trichloroacetic acid addition salts of the compounds of Formula I are useful as herbicides, e.g., against Johnson grass, yellow foxtail, green foxtail, Bermuda grass, and quack grass.

The starting materials, 2,3-bis(p-methoxyphenyl)indoles of Formula III, are prepared as shown in detail in examples.

In carrying out the process of the present invention a selected 2,3-bis(p-methoxyphenyl)indole (III) is demethylated with a Lewis acid in a solvent which cannot participate in the reaction. The preferred Lewis acid for this reaction is aluminum chloride. Aluminum bromide can also be used. The Lewis acid is used preferably in an excess of between 3 to 10 molar equivalents. As solvent, benzene, toluene, xylene and the like can be used with benzene preferred. The reaction may be carried out at a temperature of between 50° C. and the reflux temperature of the reaction mixture by heating the mixture for a period of 2 to 24 hours. In the preferred embodiment of this invention a selected starting material is heated in benzene at reflux (about 80° C.) for a period of about 4 hours in the presence of 5 molar equivalents of aluminum chloride. The demethylation may also be accomplished by heating the starting material with pure pyridine hydrochloride at a temperature between 200 to 220° C. without solvents, for a period of between 1 to 24 hours. After the reaction is terminated, the mixture is cooled and treated with an excess of aqueous hydrochloric acid to decompose the aluminum complexes. The solids are collected by filtration and washed with water. The thus-obtained crude material is furthermore purified by conventional means such as alternate washings of the material with base and acid, chromatography, crystallization and recrystallization and the like.

The thus-obtained 2,3-bis(p-hydroxyphenyl)indole (II) is then submitted to O-alkylation with a selected aminoalkyl halide in the presence of an alkali metal metathetically reactive agent, such as alkali metal hydrides, e.g., sodium hydride, lithium hydride, potassium hydride, triphenylmethyl alkali metal compounds such as triphenylmethyl sodium, triphenylmethyl potassium, alkali metal alkyls such as propyl lithium, butyl lithium, phenyl lithium, or bases such as sodamide, potassamide, sodium and potassium carbonate, and the like. As solvent or dispering agent, solvents such as dimethylformamide, dimethyl sulfoxide, tetramethylurea, N-methylpyrrolidone, ether, benzene, toluene or the like may be used. The reaction is generally carried out at a temperature between 20° and 95° C.

The O-alkylation reagents used are of the formula

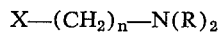

wherein the parameters X, $n$ and $N(R)_2$ have the same significance as previously stated. Illustrative O-alkylation reagents include: 2-dimethylaminoethyl chloride, 2-diethylaminoethyl chloride, 3-dimethylaminopropyl chloride, 3-dipropylaminopropyl chloride, 3-diisopropylaminopropyl bromide, 2-ethylmethylaminoethyl bromide, 2-pyrrolidinoethyl chloride, 2-piperidinoethyl chloride, 3-pyrrolidinopropyl chloride, 3-piperidinopropyl bromide, 3-(2-methylpyrrolidino)propyl chloride, 2-(2-isopropylpyrrolidino)ethyl chloride, 2-(3,4-dimethylpiperidino)ethyl bromide, 2-(2,2-dimethylpyrrolidino)ethyl chloride and the like. In the preferred embodiment of this invention the O-alkylating reagent and the alkali metal metathetically reactive agent are used in the stoichiometrically calculated amount, i.e., in the ratio of 2 moles of each per mole of the intermediate Compound II. At the termination of the reaction, the product is isolated and purified by conventional means such as extraction, chromatography, recrystallization and the like.

The following examples are illustrative of the process and the products of the present invention, but are not to be construed as limiting.

EXAMPLE 1

*2,3-bis(p-methoxyphenyl)indole*

A mixture of phenylhydrazine (53 g.; 0.49 mole), deoxyanisoin (125 g.; 0.49 mole), glacial acetic acid (4.3 ml.) and 530 ml. of benzene was refluxed for three hours, using an azeotropic separator; 9.2 ml. of water was collected. The solution was evaporated to dryness. Ethanolic hydrogen chloride (960 ml. of 3 N) was added, the mixture was refluxed for 1.25 hr., evaporated to dryness, and 400 ml. of water and 400 ml. of methylene chloride were then added. After shaking, the layers were separated and the aqueous layer was extracted with 200 ml. of methylene chloride. The combined methylene chloride extract and original layer were washed with water (2 portions, each 200 ml.), 5 percent aqueous sodium hydroxide solution (3 portions, each 100 ml.) and saturated sodium chloride solution (200 ml.). The washed methylene chloride solution was then dried by passage through anhydrous sodium sulfate (about 300 g.) and evapoarted to dryness to give 170 g. of a brown oil. The oil was dissolved in 300 ml. of methylene chloride and chromatographed on 3 kg. of diatomaceous earth which occupied the space of 8 cm. x 100 cm. in a column. Methylene chloride was used as eluant and 400-ml. fractions were collected. The first eight fractions did not contain the desired compound. The next nine fractions gave 82.5 g. of product which was recrystallized from about 500 ml. of absolute ethanol, filtered, washed with ethanol, and dried to constant weight under vacuum at 60° C. to give 60.4 g. of 2,3-bis(p-methoxyphenyl)indole which melted between 151–152° C.

*Analysis.*—Calcd. for $C_{22}H_{19}NO_2$: C, 80.22; H, 5.81; N, 4.25. Found: C, 79.90; H, 5.85; N, 4.15.

EXAMPLE 2

*5-methoxy-2,3-bis(p-hydroxyphenyl)indole*

To a solution of 4,4'-dihydroxydeoxybenzoin (0.1 mole) in benzene (1 l.) was added p-methoxyphenylhydrazine (0.106 mole) and 2 ml. of glacial acetic acid. The resulting solution was refluxed under nitrogen for one hour with azeotropic distillation of the water formed during the reaction. Concentration of the reaction mixture under reduced pressure yielded an oil which was treated with 250 ml. of 3 N ethanolic hydrogen chloride. The resulting solution was refluxed for one hour, cooled, and treated with water. This mixture was extracted with methylene chloride. The combined extracts were washed with water, dried over anhydrous magnesium sulfate, and concentrated under reduced pressure, to yield a crude product which was recrystallized from ethanol to give 5-methoxy-2,3-bis(p-hydroxyphenyl)indole.

In the same manner as shown above, 5-ethoxy-2,3-bis(p-hydroxyphenyl)indole, 5-propoxy-2,3-bis(p-hydroxyphenyl)indole, 7-methoxy-2,3-bis(p-hydroxyphenyl)indole, 7-ethoxy-2,3-bis(p-hydroxyphenyl)indole, and 7-propoxy-2,3-bis(p-hydroxyphenyl)indole are prepared by substituting p-ethoxyphenylhydrazine, p-propoxyphenylhydriazine, o-methoxyphenylhydrazine, o-ethoxyphenylhydrazine, and o-propoxyphenylhydrazine, respectively, for p-methoxyphenylhydrazine.

EXAMPLE 3

*4-methoxy-2,3-bis(p-hydroxyphenyl)indole and 6-methoxy-2,3-bis(p-hydroxyphenyl)indole*

To a stirred mixture of 3 N sodium hydroxide (100 ml.) and ether (100 ml.), cooled to 0° C., was added 20.5 g. (0.115 mole) of m-methoxyphenylhydrazine hydrochloride (Alberti et al., Farmaco Ed. Sci. 17, 443, 1962). The aqueous layer was saturated with sodium chloride, separated from the ether layer, and extracted twice with 200 ml. portions of ether. The combined ether extracts and original layer were washed with 50 ml. of saturated sodium chloride solution, dried over anhydrous magnesium sulfate, and concentrated under reduced pressure at 25° C. A solution of the resulting light yellow, oily, m-methoxyphenylhydrazine in benzene (1 l.) was treated with 0.1 mole of 4,4'-dihydroxydeoxybenzoin and 2 ml. of glacial acetic acid. The resulting solution was refluxed under nitrogen for about 30 minutes with azeotropic distillation of water, and concentrated under reduced pressure at 35° C. The residue was treated with ice-cold 3 N ethanolic hydrogen chloride (200 ml.); the mixture was refluxed for 30 minutes under nitrogen, cooled, and treated with 1 l. of ice water. This mixture was extracted with methylene chloride (4 portions, each 500 ml.). The combined methylene chloride extracts were washed with saturated sodium chloride solution (500 ml.), dried over anhydrous magnesium sulfate, and concentrated under reduced pressure at 35° C. Chromatography of the residue on diatomaceous earth (1.5 kg.) with methylene chloride resulted in a preliminary purification of two isomeric compounds. A separation of these compounds was obtained by careful chromatography on silica gel with 20 percent ethyl acetate-cyclohexane, yielding 4-methoxy-2,3-bis(p-hydroxyphenyl)indole and 6-ethoxyphenyl)indole; and 4-propoxy-2,3-bis(p-hydroxyphenyl)indole and 6-propoxy-2,3-bis(p-hydroxy)indole are prepared by substituting m-ethoxyphenylhydrazine hydrochloride and m-propoxyphenylhydrazine hydrochloride, respectively, for m-methoxyphenylhydrazine hydrochloride.

In the same manner as shown above, 1-methyl-4-methoxy - 2,3 - bis(p - hydroxyphenyl)indole and 1 - methyl-6 - methoxy - 2,3 - bis(p - hydroxyphenyl)indole are prepared by substituting 1 - methyl - 1 - (m - methoxyphenyl)hydrazine hydrochloride for m - methoxyphenylhydrazine (14.1 g.; 0.115 mole—prepared from the com-

EXAMPLE 4

*7-methyl-2,3-bis(p-methoxyphenyl)indole*

A mixture of deoxyanisoin (25.6 g.; 0.1 mole), o-tolylhydrazine (14.1 g.; 0.115 mole—prepared from the commercial hydrochloride by treatment with sodium hydroxide followed by ether extraction), benzene (1 l.), and glacial acetic acid (2 ml.) was refluxed under nitrogen for 45 minutes with azeotropic distillation of the water formed during the reaction. The solution was concentrated under reduced pressure at 35° C. and the residue was treated with 200 ml. of ice-cold 3 N ethanolic hydrogen chloride. This mixture was refluxed for one hour, poured into 1 l. of ice water, and extracted with methylene chloride (3 portions, each 500 ml.). The combined methylene chloride extracts were washed with water (500 ml.), dried over anhydrous magnesium sulfate, and concentrated under reduced pressure. Chromatography of the residue on diatomaceous earth (1.5 kg.) with methylene chloride (4 l.) gave a crude product which was recrystallized twice from methylene chloride-ethanol to yield 3.83 g. of 7 - methyl - 2,3 - bis(p - methoxyphenyl)indole which melted between 124–125° C.

*Analysis.*—Calcd. for $C_{23}H_{21}NO_2$: C, 80.44; H, 6.16; N, 4.08. Found: C, 80.55; H, 6.21; N, 4.23.

In the same manner as shown above, 7-ethyl-2,3-bis(p-methoxyphenyl)indole, 7 - propyl - 2,3 - bis(p - methoxyphenyl)indole, 5 - methyl - 2,3 - bis(p-methoxyphenyl)indole (crystallized from ethanol and melting between 161–162° C.), 5 - isopropyl-2,3-bis(p-methoxyphenyl)indole, and 5 - ethyl - 2,3 - bis(p - methoxyphenyl)indole are prepared by substituting o-ethylphenylhydrazine, o-propylphenylhydrazine, p - tolylhydrazine, p - isopropylphenylhydrazine, and p-ethylphenylhydrazine, respectively, for o-tolylhydrazine.

EXAMPLE 5

*5-fluoro-2,3-bis(p-methoxyphenyl)indole*

To a stirred mixture of 3 N sodium hydroxide (100 ml.) and ether (100 ml.), cooled to 0° C., was added p-fluorophenylhydrazine hydrochloride (17.2 g.; 0.105 mole). The aqueous layer was saturated with sodium chloride, separated from the ether layer, and extracted twice with 200 ml. portions of ether. The combined ether extracts and original layer were washed with 50 ml. of saturated sodium chloride solution, dried over anhydrous magnesium sulfate, and concentrated under reduced pressure at 25° C. A solution of the resulting p-fluorophenylhydrazine in benzene (600 ml.) was treated with deoxyanisoin (25.6 g.; 0.1 mole) and glacial acetic acid (2.0 ml.) and the mixture was refluxed for one hour with azeotropic distillation of water. The benzene was removed under reduced pressure at 35° C. The residue was dissolved in 100 ml. of ethanol, and the solution was cooled in an ice bath, treated with 100 ml. of 6 N ethanolic hydrogen chloride, and refluxed for 45 minutes. Concentration of the resulting dark mixture yielded an oil which was treated with water (800 ml.). The aqueous mixture was extracted with methylene chloride (3 portions, each 250 ml.). The combined methylene chloride extracts were washed with saturated sodium chloride solution, dried over anhydrous magnesium sulfate, and concentrated under reduced pressure. Chromatography of the residue on diatomaceous earth (1500 g.) with methylene chloride gave a product which was crystallized from methylene chloride-ethanol to yield 4.5 g. of 5 - fluoro - 2,3 - bis(p - methoxyphenyl)indole which melted between 129–130° C.

*Analysis.*—Calcd. for $C_{22}H_{18}FNO_2$: C, 76.06; H, 5.22; F, 5.47; N, 4.03. Found: C, 75.86; N, 5.17; F, 5.29; N, 4.07.

In the same manner as shown above, 5 - bromo-2,3 - bis(p - methoxyphenyl)indole, 5 - chloro - 2,3 - bis(p-methoxyphenyl)indole (crystallized from ethanol and melting between 165–166° C.), and 5-iodo-2,3-bis(p-methoxyphenyl)indole are prepared by substituting p-bromophenylhydrazine, p - chlorophenylhydrazine, and p-iodophenylhydrazine, respectively, for p-fluorophenylhydrazine.

EXAMPLE 6

*7-fluoro-2,3-bis(p-methoxyphenyl)indole* o-Fluorophenylhydrazine hydrochloride (Suchitzky, J. Chem. Soc., 3326, 1953) was converted to the free base by reaction with 3 N sodium hydroxide. A solution of the resulting o-fluorophenylhydrazine (10.08 g.; 0.08 mole) in benzene (600 ml.) was treated with 20.0 g. (0.078 mole) of deoxyanisoin and 2.0 ml. of glacial acetic acid and refluxed for one hour with azeotropic distillation of water. The benzene was removed under reduced pressure at 35° C. A solution of the residue in ethanol (100 ml.) was cooled in an ice bath, treated with 6 N ethanolic hydrogen chloride (100 ml.), and refluxed for one hour. Concentration of the resulting mixture gave a dark oil which was treated with water (700 ml.). The aqueous mixture was extracted with methylene chloride (3 portions, each 250 ml.). The combined methylene chloride extracts were washed with saturated sodium chloride solution, dried over anhydrous magnesium sulfate, and concentrated under reduced pressure. Chromatography of the residue on diatomaceous earth (1500 g.) with methylene chloride gave a product which was crystallized from methylene chloride-ethanol to yield 1.57 g. of 7-fluoro-2,3-bis(p-methoxyphenyl)indole which melted between 159–159.5° C.

*Analysis.*—Calcd. for $C_{22}H_{18}FNO_2$: C, 76.06; H, 5.22; F, 5.47; N, 4.03. Found: C, 76.25; H, 5.31; F, 4.90; N, 4.04.

In the same manner as shown above, 7-bromo-2,3-bis(p - methoxyphenyl)indole, 7 - chloro - 2,3 - bis(p - methoxyphenyl)indole, and 7 - iodo - 2,3 - bis(p - methoxyphenyl)indole are prepared by substituting o-bromophenylhydrazine, o - chlorophenylhydrazine, and o - iodophenylhydrazine, respectively, for o-fluorophenylhydrazine.

EXAMPLE 7

*4-methyl-2,3-bis(p-methoxyphenyl)indole and 6-methyl-2,3-bis(p-methoxyphenyl)indole*

In the same manner as shown in Example 3, 4-methyl-2,3 - bis(p - methoxyphenyl)indole and 6 - methyl - 2,3-bis(p-methoxyphenyl)indole are prepared by substituting m-tolylhydrazine hydrochloride for m-methoxyphenylhydrazine hydrochloride.

Similarly, 4 - ethyl - 2,3 - bis(p - methoxyphenyl)indole and 6 - ethyl - 2,3 - bis(p - methoxyphenyl)indole; and 4-propyl - 2,3 - bis(p - methoxyphenyl)indole and 6 - propyl-2,3-bis(p-methoxyphenyl)indole are prepared by substituting m-ethylphenylhydrazine hydrochloride and m-propylphenylhydrazine hydrochloride, respectively, for m-methoxyphenylhydrazine hydrochloride.

EXAMPLE 8

*4-fluoro-2,3-bis(p-methoxyphenyl)indole and 6-fluoro-2,3-bis(p-methoxyphenyl)indole*

In the same manner as shown in Example 3, 4-fluoro-2,3-bis(p-methoxyphenyl)indole and 6-fluoro-2,3-bis(p-methoxyphenyl)-indole are prepared by substituting m-fluorophenylhydrazine hydrochloride for m-methoxyphenylhydrazine hydrochloride.

Similarly, 4- bromo - 2,3-bis(p-methoxyphenyl)indole and 6-bromo-2,3-bis(p-methoxyphenyl)indole; 4-chloro-2,3-bis(p-methoxyphenyl)indole and 6-chloro-2,3-bis(p-methoxyphenyl)indole; and 4 - iodo-2,3-bis(p-methoxyphenyl)indole and 6-iodo-2,3-bis(p-methoxyphenyl)indole are prepared by substituting m-bromophenylhydrazine hydrochloride, m-chlorophenylhydrazine hydrochloride, and m-iodophenylhydrazine hydrochloride, respectively, for m-methoxyphenylhydrazine hydrochloride.

EXAMPLE 9

*1-acetyl-2,3-bis(p-methoxyphenyl)indole*

Sodium hydride in the form of a 53 percent suspension in mineral oil (0.46 g. of suspension containing 10 mmoles of the hydride) was added, under a nitrogen atmosphere, to a stirred solution of 2,3-bis(p-methoxyphenyl)indole (3.3 g.; 10 mmoles) in 50 ml. of dimethylformamide. The mixture was stirred for two hours, acetyl chloride (0.785 g.; 10 mmoles) was added, and stirring was continued for an additional 24 hours. The mixture was evaporated to dryness under reduced pressure. The residue was thoroughly mixed with 50 ml. of water and 50 ml. of diethyl ether, and the layers were separated. The organic layer was washed successively with 25 ml. of water and two 25-ml. portions of saturated aqueous sodium chloride solution. The washed solution was dried with anhydrous sodium sulfate and evaporated to dryness. The yellow powder thus obtained was washed with petroleum ether (boiling range 30–60° C.) to remove mineral oil. The residue (3.2 g.) was chromatographed on 96 g. of silica gel, using ethyl acetate-cyclohexane (1:4 by volume). The first 200 ml. of eluate was discarded. The next 200 ml. of eluate was evaporated to dryness. There was thus obtained 2.33 g. of 1-acetyl-2,3-bis(p-methoxyphenyl)indole, which on recrystallization from diethyl ether melted between 146.5–148° C.

*Analysis.*—Calcd. for $C_{24}H_{21}NO_3$: C, 77.60; H, 5.70; N, 3.77. Found: C, 77.32; H, 5.96; N, 3.74.

In the same manner as shown above, 1-propionyl-2,3-bis(p - methoxyphenyl)indole, 1 - butyryl-2,3-bis(p-methoxyphenyl)indole, and 1-isobutyryl-2,3-bis(p-methoxyphenyl)indole are prepared by substituting propionyl chloride, butyryl chloride, and isobutyryl chloride, respectively, for acetyl chloride.

In the same manner as shown above, 1-acetyl-5-methyl-2,3-bis(p-methoxyphenyl)indole, 1-acetyl-7-methyl-2,3-bis(p - methoxyphenyl)indole, 1 - acetyl-5-fluoro-2,3-bis(p-methoxyphenyl)indole, 1 - acetyl-7-fluoro-2,3-bis(p-methoxyphenyl)indole, and 1-acetyl-5-chloro-2,3-bis(p-methoxyphenyl)indole are prepared by substituting 5-methyl-2,3 - bis(p - methoxyphenyl)indole, 7-methyl-2,3-bis(p-methoxyphenyl)indole, 5-fluoro-2,3-bis(p-methoxyphenyl)indole, 7 - fluoro-2,3-bis(p-methoxyphenyl)indole, and 5-chloro-2,3-bis(p-methoxyphenyl)indole, respectively, for 2,3-bis(p-methoxyphenyl)-indole.

EXAMPLE 10

*1-methyl-2,3-bis(p-methoxyphenyl)indole*

A mixture of deoxyanisoin (58.8 g.; 0.23 mole), 1-methyl-1-phenylhydrazine (28.0 g.; 0.23 mole), 2 ml. of glacial acetic acid, and 250 ml. of benzene was refluxed under nitrogen for seven hours using an azeotropic separator; 4 ml. of water was collected. The solution was allowed to stand for 16 hours, and the resulting suspension was evaporated to dryness under reduced pressure. Ethanolic hydrogen chloride (450 ml. of 3N) was added and the mixture was heated on the steambath for 75 min., evaporated to dryness under reduced pressure, and 200 ml. of water was added. The mixture was then extracted with methylene chloride (4 portions, each 100 ml.). The combined methylene chloride extracts were washed successively with water, 5 percent aqueous sodium hydroxide solution, and saturated sodium chloride solution, and then dried by passage through anhydrous sodium sulfate and evaporated to dryness. The resulting crude product was dissolved in methylene chloride and passed through a column containing 2 kg. of Florisil (synthetic magnesia silica gel). Elution with 12 portions, each 400 ml., of methylene chloride gave 24.3 g. of product. The product was crystallized from ethanol to give 18.3 g. (23 percent yield) of 1-methyl-2,3-bis(p-methoxyphenyl)indole which melted between 127–129.5° C.

*Analysis.*—Calcd. for $C_{23}H_{21}NO_2$: C, 80.44; H, 6.16; N, 4.08. Found: C, 80.83; H, 5.84; N, 4.23.

In the same manner as shown in Example 10, 1,5-dimethyl - 2,3 - bis(p-methoxyphenyl)indole, 1,7-dimethyl-2,3 - bis(p-methoxyphenyl)indole, 1-methyl-5-fluoro-2,3-bis(p - methoxyphenyl)indole, 1-methyl-5-chloro-2,3-bis(p-methoxyphenyl)indole, and 1-methyl-7-fluoro-2,3-bis(p-methoxyphenyl)indole are prepared by substituting 1-methyl - 1-(p-tolyl)hydrazine, 1-methyl-1-(o-tolyl)hydrazine, 1-methyl-1-(p-fluorophenyl)hydrazine, 1-methyl-1-(p - chlorophenyl)hydrazine, and 1-methyl-1-(o-fluorophenyl)hydrazine, respectively, for 1-methyl-1-phenylhydrazine.

EXAMPLE 11

*1-formyl-2,3-bis(p-methoxyphenyl)indole*

Magnesium (2.4 g.; 0.1 mole) was converted in a conventional manner to methylmagnesium iodide using methyl iodide (14.2 g.; 0.1 mole), a crystal of iodine, and 10 ml. of anisole. A solution of 2,3-bis(p-methoxyphenyl)indole (3.29 g.; 0.1 mole) in 10 ml. of anisole was added, and the mixture was stirred for 1 hr. at 25° C. Ethyl formate (7.4 g.; 0.1 mole) was added with ice-cooling. The mixture was stirred for 16 hours at 25° C. and then cooled in an ice-bath and 10 ml. of water was added. The organic layer was decanted, and the aqueous layer was extracted with methylene chloride. The combined organic layer and extract was washed with water and then with saturated sodium chloride solution, dried over magnesium sulfate, and evaporated to give the desired product, 1-formyl-2,3-bis(p-methoxyphenyl)indole.

In the same manner as shown above, 1-formyl-5-methyl - 2,3 - bis(p-methoxyphenyl)indole, 1 - formyl - 7 - methyl-2,3-bis(methoxyphenyl)indole, 1-formyl-5 - fluoro-2,3-bis(p-methoxyphenyl)indole, 1-formyl-7-fluoro-2,3-bis(p-methoxyphenyl)indole, and 1-formyl-5-chloro-2,3-bis(p-methoxyphenyl)indole are prepared by substituting 5-methyl-2,3-bis(p-methoxyphenyl)indole, 7-methyl-2,3-bis(p-methoxyphenyl)indole, 5 - fluoro - 2,3 - bis(p-methoxyphenyl)indole, 7-fluoro-2,3-bis(p-methoxyphenyl)indole, and 5-chloro-2,3-bis(p-methoxyphenyl)indole, respectively, for 2,3-bis(p-methoxyphenyl)indole.

EXAMPLE 12

*2,3-bis(p-hydroxyphenyl)indole*

To a solution of 33 g. (0.1 mole) of 2,3-bis(p-methoxyphenyl) indole in 1 l. of dry benzene was added 66.5 g. (0.5 mole) of aluminum chloride while the solution was stirred under cooling in a nitrogen atmosphere. The mixture was then kept at reflux for a period of 4 hrs., cooled in an ice-bath, and decomposed by the addition of a solution of 500 ml. of concentrated hydrochloric acid in 1500 ml. of water. The resulting suspension was filtered and the solid product washed repeatedly with water. The product thus obtained was dissolved in 750 ml. of 5 percent aqueous sodium hydroxide, the resulting dark green solution was filtered, cooled to about 0 to about 5° C. and was acidified with 250 ml. of concentrated hydrochloric acid. The thus obtained mixture was filtered, the solids remaining on the filter were washed with water and dried to yield 33.6 g. of crude product. This crude material was dissolved in about 1 l. of ethyl acetate and the resulting solution passed through a column containing 1,000 g. of silica gel. The column was thereupon eluted with 400-ml. portions of ethyl acetate. The first four 400-ml. fractions (1–4) were discarded; fractions 5, 6, and 7 were evaporated to give a solid which was triturated with chloroform to give 11.2 g. of material melting at 212 to 214° C. and 3 g. of material melting at 198 to 211° C. The filtrate from the trituration and fractions 8 and 9, each fraction 400 ml., were combined, evaporated, and the resulting solid material rechromatographed over 330 g. of silica gel using a solution of methanol-chloroform (5:95). The elution was carried out with 9 fractions of 250 ml. each. Fractions 1 through 5 were discarded; fractions 6, 7, 8 and 9 were evaporated and crystallized from ethyl acetate to give 6.1 g. of 2,3-bis(p-hydroxyphenyl)indole of melting point 213 to 214° C. (total yield was 68 percent. Part of this material was recrystallized from aqueous ethanol to give an analytically pure sample having a melting point of 212 to 214° C.

*Analysis.*—Calcd. for $C_{20}H_{15}HO_2$: C, 79.71; H, 5.02; N, 4.65. Found: C, 79.69; H, 5.10; N, 4.59.

EXAMPLE 13

*2,3-bis[p-[2-(diethylamino)ethoxy]phenyl]indole*

A solution was prepared containing in 50 ml. of dimethylformamide 3 g. (0.01 mole) of 2-3-bis(p-hydroxyphenyl indole. To this solution was added over a period of 30 seconds, in portions, 0.92 g. of a 53 percent suspension of sodium hydride in mineral oil (containing 0.02 mole of sodium hydride) and the thus obtained mixture was stirred at room temperature (about 25° C.) for 30 minutes. A clear, greenish solution resulted. To this solution was added, dropwise, over a period of three minutes, 2.71 g. (0.02 mole) of 2-diethylaminoethyl chloride previously diluted with xylene in a weight ratio of 1 to 1. The thus obtained reaction mixture was allowed to stand at room temperature for 21 hours. It was thereupon evaporated, giving an oily material. This material was added to 50 ml. of water and 50 ml. of methylene chloride. The mixture was shaken, the methylene chloride layer separated and extracted with 125 ml. of 10 percent aqueous hydrochloric acid. The acid extract was thereupon cooled, aqueous sodium hydroxide was added until the solution was basic, and the basic solution was extracted three times with methylene chloride. The combined methylene chloride extracts were washed with water, then with sodium chloride solution, and dried by being passed through anhydrous sodium sulfate. The dried methylene chloride solution was evaporated to give 4.7 g. of a dark brown oil. The oil was dissolved in 20 ml. of benzene and chromatographed over 141 g. of neutral alumina in the following manner: The column was eluted first with six 100-ml. portions of ether; resulting fractions 2, 3, 4, 5 and 6 were combined and fraction 1 was discarded. The column was then eluted with two 125-ml. portions of ether containing 0.5 percent methanol and then with 2 portions of 125 ml. each of ether containing 1 percent methanol which were added to the prior ether extracts. The combined extracts were thereupon evaporated to give 2.88 g. of a crude product. The crude product was first crystallized from Skellysolve B hexanes followed by recrystallization from cyclohexane to give 1.9 g. (38 percent yield) of 2,3-bis[p-[2-(diethylamino)ethoxy]phenyl]indole of melting point 99 to 101° C.

*Analysis.*—Calcd. for $C_{32}H_{41}N_3O_2$: C, 76.91; H, 8.27; N, 8.41. Found: C, 76.80; H, 8.64; N, 8.36.

EXAMPLE 14

*7-methyl-2,3-bis(p-hydroxy)indole*

In the manner given in Example 12, 7-methyl-2,3-bis(p-methoxyphenyl)indole in benzene was refluxed with aluminum chloride for a period of 4 hours; the resulting mixture was treated with aqueous hydrochloric acid to give 7-methyl-2,3-bis(p-hydroxyphenyl)indole.

EXAMPLE 15

*7-ethyl-2,3-bis(p-hydroxyphenyl)indole*

In the manner given in Example 12, 7-ethyl-2,3-bis(p-methoxyphenyl)indole in benzene was refluxed with aluminum chloride for a period of 4 hours; the resulting mixture was treated with aqueous hydrochloric acid to give 7-ethyl-2,3-bis(p-hydroxyphenyl)indole.

EXAMPLE 16

*7-propyl-2,3-bis(p-hydroxyphenyl)indole*

In the manner given in Example 12, 7-propyl-2,3-bis(p-methoxyphenyl)indole in benzene was refluxed with aluminum chloride for a period of 4 hours; the resulting mixture was treated with aqueous hydrochloric acid to give 7-propyl-2,3-bis(p-hydroxyphenyl)indole.

EXAMPLE 17

*5-isopropyl-2,3-bis(p-hydroxyphenyl)indole*

In the manner given in Example 12, 5-isopropyl-2,3-bis(p-methoxyphenyl)indole in benzene was refluxed with aluminum chloride for a period of 4 hours; the resulting mixture was treated with aqueous hydrochloric acid to give 5-isopropyl-2,3-bis(p-hydroxyphenyl)indole.

EXAMPLE 18

*5-methyl-2,3-bis(p-hydroxyphenyl)indole*

In the manner given in Example 12, 5-methyl-2,3-bis(p-methoxyphenyl)indole in benzene was refluxed with aluminum chloride for a period of 4 hours; the resulting mixture was treated with aqueous hydrochloric acid to give 5-methyl-2,3-bis(p-hydroxyphenyl)indole.

EXAMPLE 19

*5-ethyl-2,3-bis(p-hydroxyphenyl)indole*

In the manner given in Example 12, 5-ethyl-2,3-bis(p-methoxyphenyl)indole in benzene was refluxed with aluminum chloride for a period of 4 hours; the resulting mixture was treated with aqueous hydrochloric acid to give 5-ethyl-2,3-bis(p-hydroxyphenyl)indole.

EXAMPLE 20

*5-fluoro-2,3-bis(p-hydroxyphenyl)indole*

In the manner given in Example 12, 5-fluoro-2,3-bis(p-methoxyphenyl)indole in benzene was refluxed with aluminum chloride for a period of 4 hours; the resulting mixture was treated with aqueous hydrochloric acid to give 5-fluoro-2,3-bis(p-hydroxyphenyl)indole.

EXAMPLE 21

*7-fluoro-2,3-bis(p-hydroxyphenyl)indole*

In the manner given in Example 12, 7-fluoro-2,3-bis(p-methoxyphenyl)indole in benzene was refluxed with aluminum chloride for a period of 4 hours; the resulting mixture was treated with aqueous hydrochloric acid to give 7-fluoro-2,3-bis(p-hydroxyphenyl)indole.

EXAMPLE 22

*7-chloro-2,3-bis(p-hydroxyphenyl)indole*

In the manner given in Example 12, 7-chloro-2,3-bis(p-methoxyphenyl)indole in benzene was refluxed with aluminum chloride for a period of 4 hours; the resulting mixture was treated with aqueous hydrochloric acid to give 7-chloro-2,3-bis(p-hydroxyphenyl)indole.

EXAMPLE 23

*4-ethyl-2,3-bis(p-hydroxyphenyl)indole*

In the manner given in Example 12, 4-ethyl-2,3-bis(p-methoxyphenyl)indole in benzene was refluxed with aluminum chloride for a period of 4 hours; the resulting mixture was treated with aqueous hydrochloric acid to give 4-ethyl-2,3-bis(p-hydroxyphenyl)indole.

EXAMPLE 24

*1-methyl-2,3-bis(p-hydroxyphenyl)indole*

In the manner given in Example 12, 1-methyl-2,3-bis(p-methoxyphenyl)indole in benzene was refluxed with aluminum chloride for a period of 4 hours; the resulting mixture was treated with aqueous hydrochloric acid to give 1-methyl-2,3-bis(p-hydroxyphenyl)indole.

EXAMPLE 25

*1,5-dimethyl-2,3-bis(p-hydroxyphenyl)indole*

In the manner given in Example 12, 1,5-dimethyl-2,3-bis(p-methoxyphenyl)indole in benzene was refluxed with aluminum chloride for a period of 4 hours; the resulting mixture was treated with aqueous hydrochloric acid to give 1,5-dimethyl-2,3-bis(p-hydroxyphenyl)indole.

EXAMPLE 26

*1-methyl-5-chloro-2,3-bis(p-hydroxyphenyl)indole*

In the manner given in Example 12, 1-methyl-5-chloro-2,3-bis(p-methoxyphenyl)indole in benzene was refluxed with aluminum chloride for a period of 4 hours; the resulting mixture was treated with aqueous hydrochloric acid to give 1-methyl-5-chloro-2,3-bis(p-hydroxyphenyl)indole.

EXAMPLE 27

*1-formyl-2,3-bis(p-hydroxyphenyl)indole*

In the manner given in Example 12, 1-formyl-2,3-bis(p-methoxyphenyl)indole in benzene was refluxed with aluminum chloride for a period of 4 hours; the resulting mixture was treated with aqueous hydrochloric acid to give 1-formyl-2,3-bis(p-hydroxyphenyl)indole.

EXAMPLE 28

*1-formyl-5-methyl-2,3bis(p-hydroxyphenyl)indole*

In the manner given in Example 12, 1-formyl-5-methyl-2,3-bis(p-methoxyphenyl)indole in benzene was refluxed with aluminum chloride for a period of 4 hours; the resulting mixture was treated with aqueous hydrochloric acid to give 1-formyl-5-methyl-2,3-bis(p-hydroxyphenyl)indole.

EXAMPLE 29

*1-acetyl-5-methyl-2,3-bis(p-hydroxyphenyl)indole*

In the manner given in Example 12, 1-acetyl-5-methyl-2,3-bis(p-methoxyphenyl)indole in benzene was refluxed with aluminum chloride for a period of 4 hours; the resulting mixture was treated with aqueous hydrochloric acid to give 1-acetyl-5-methyl-2,3-bis(p-hydroxyphenyl)indole.

EXAMPLE 30

*5-bromo-2,3-bis(p-hydroxyphenyl)indole*

In the manner given in Example 12, 5-bromo-2,3-bis(p-methoxyphenyl)indole in benzene was refluxed with aluminum chloride for a period of 4 hours; the resulting mixture was treated with aqueous hydrochloric acid to give 5-bromo-2,3-bis(p-hydroxyphenyl)indole.

EXAMPLE 31

*7-iodo-2,3-bis(p-hydroxyphenyl)indole*

In the manner given in Example 12, 7-iodo-2,3-bis(p-methoxyphenyl)indole in benzene was refluxed with aluminum chloride for a period of 4 hours; the resulting mixture was treated with aqueous hydrochloric acid to give 7-iodo-2,3-bis(p-hydroxyphenyl)indole.

EXAMPLE 32

*1-propionyl-2,3-bis(p-hydroxyphenyl)indole*

In the manner given in Example 12, 1-propionyl-2,3-bis(p-methoxyphenyl)indole in benzene was refluxed with aluminum chloride for a period of 4 hours; the resulting mixture was treated with aqueous hydrochloric acid to give 1-propionyl-2,3-bis(p-hydroxyphenyl)indole.

EXAMPLE 33

*1-butyryl-2,3-bis(p-hydroxyphenyl)indole*

In the manner given in Example 12, 1-butyryl-2,3-bis(p-methoxyphenyl)indole in benzene was refluxed with aluminum chloride for a period of 4 hours; the resulting mixture was treated with aqueous hydrochloric acid to give 1-butyryl-2,3-bis(p-hydroxyphenyl)indole.

In the same manner given in Example 12, other substituted 2,3-bis(p-hydroxyphenyl)indoles can be prepared by heating to reflux a corresponding substituted 2,3-bis(p-methoxyphenyl)indole with aluminum chloride or bromide in benzene solution. Representative substituted 2,3-bis(p-hydroxyphenyl)indoles, thus produced, include:

5-chloro-2,3-bis(p-hydroxyphenyl)indole;
5-iodo-2,3-bis(p-hydroxyphenyl)indole;
7-bromo-2,3-bis(p-hydroxyphenyl)indole;
4-fluoro-2,3-bis(p-hydroxyphenyl)indole;
6-fluoro-2,3-bis(p-hydroxyphenyl)indole;
4-bromo-2,3-bis(p-hydroxyphenyl)indole;
4-chloro-2,3-bis(p-hydroxyphenyl)indole;
6-chloro-2,3-bis(p-hydroxyphenyl)indole;
6-bromo-2,3-bis(p-hydroxyphenyl)indole;
4-iodo-2,3-bis(p-hydroxyphenyl)indole;
6-iodo-2,3-bis(p-hydroxyphenyl)indole;
1-acetyl-2,3-bis(p-hydroxyphenyl)indole;
1-isobutyryl-2,3-bis(p-hydroxyphenyl)indole;
1-acetyl-5-fluoro-2,3-bis(p-hydroxyphenyl)indole;
1-acetyl-7-fluoro-2,3-bis(p-hydroxyphenyl)indole;
1-acetyl-5-chloro-2,3-bis(p-hydroxyphenyl)indole;
1,7-dimethyl-2,3-bis(p-hydroxyphenyl)indole;
1-methyl-5-fluoro-2,3-bis(p-hydroxyphenyl)indole;
1-methyl-5-chloro-2,3-bis(p-hydroxyphenyl)indole;
1-methyl-7-fluoro-2,3-bis(p-hydroxyphenyl)indole;
1-formyl-7-methyl-2,3-bis(p-hydroxyphenyl)indole;
1-formyl-5-fluoro-2,3-bis(p-hydroxyphenyl)indole;
1-formyl-7-fluoro-2,3-bis(p-hydroxyphenyl)indole;

and the like.

EXAMPLE 34

*7-methyl-2,3-bis[p-[2-(diethylamino)ethoxy]phenyl]-indole*

In the manner given in Example 13, 7-methyl-2,3-bis-(p-hydroxyphenyl)indole was reacted with 2-diethylaminoethyl chloride diluted with xylene in a 1:1 ratio, in the presence of sodium hydride, to give 7-methyl-2,3-bis-[p-[2-(diethylamino)ethoxy]phenyl]indole.

EXAMPLE 35

*7-ethyl-2,3-bis[p-[3-(dipropylamino)propoxy]phenyl]-indole*

In the manner given in Example 13, 7-ethyl-2,3-bis(p-hydroxyphenyl)indole was reacted with 3-dipropylaminopropyl chloride diluted with xylene in a 1:1 ratio, in the presence of sodium hydride, to give 7-ethyl-2,3-bis[p-[3-(dipropylamino)propoxy]phenyl]indole.

EXAMPLE 36

*7-propyl-2,3-bis[p-[2(dimethylamino)ethoxy]phenyl]indole*

In the manner given in Example 13, 7-propyl-2,3-bis-(p-hydroxyphenyl)indole was reacted with 2-dimethyl-aminoethyl chloride diluted with xylene in a 1:1 ratio, in the presence of sodium hydride, to give 7-propyl-2,3-bis[p-[2-(dimethylamino)ethoxy]phenyl]indole.

EXAMPLE 37

*5-isopropyl-2,3-bis[p-[3-(dimethylamino)propoxy]-phenyl]indole*

In the manner given in Example 13, 5-isopropyl-2,3-bis(p-hydroxyphenyl)indole was reacted with 3-dimethylaminopropyl chloride diluted with xylene in a 1:1 ratio, in the presence of potassium hydride, to give 5-isopropyl-2,3bis[p-[3-(dimethylamino)propoxy]phenyl]indole.

EXAMPLE 38

*5-methyl-2,3-bis[p-[2-(diethylamino)ethoxy]phenyl]-indole*

In the manner given in Example 13, 5-methyl-2,3-bis-[p-hydroxyphenyl]indole was reacted with 2-dimethyl-aminoethyl chloride diluted with xylene in a 1:1 ratio, in the presence of sodium hydride, to give 5-methyl-2,3-bis-[p-[2-(diethylamino)ethoxy]phenyl]indole.

EXAMPLE 39

*5-ethyl-2,3-bis[p-[2(pyrrolidino)ethoxy]ethoxy]phenyl-indole*

In the manner given in Example 13, 5-ethoxy-2,3-bis-(p-hydroxyphenyl)indole was reacted with 2-pyrrolidino-ethyl chloride diluted with xylene in a 1:1 ratio, in the presence of sodium hydride, to give 5-ethyl-2,3-bis[p-(2-pyrrolidino)ethoxy]phenyl]indole.

EXAMPLE 40

*5-fluoro-2,3-bis[p-[3-(piperidino)propoxy]phenyl]indole*

In the manner given in Example 13, 5-fluoro-2,3-bis-(p-hydroxyphenyl)indole was reacted with 3-piperidino-propyl chloride diluted with xylene in a 1:1 ratio, in the presence of sodamide to give 5-fluoro-2,3-bis[p-[3-(piperidino)propoxyl]phenyl]indole.

EXAMPLE 41

*7-fluoro-2,3-bis[p-[2-(dimethylamino)ethoxy]phenyl]-indole*

In the manner given in Example 13, 7-fluoro-2,3-bis-(p-hydroxyphenyl)indole was reacted with 2-diethyl-aminoethyl chloride diluted with xylene in a 1:1 ratio, in the presence of sodium hydride, to give 7-fluoro-2,3-bis [p-[2-(diethylamino)ethoxy]phenyl]indole.

EXAMPLE 42

*7-chloro-2,3-bis[p-[2-(dimethylamino)ethoxy]phenyl]-indole*

In the manner given in Example 13, 7-chloro-2,3-bis(p-hydroxyphenyl)indole was reacted with 2-dimethylamino-ethyl chloride diluted with xylene in a 1:1 ratio, in the presence of sodium hydride, to give 7-chloro-2,3-bis[p-[2-(diethylamino)ethoxy]phenyl]indole.

EXAMPLE 43

*4-ethyl-2,3-bis[p-[2(diethylamino)ethoxy]phenyl]-indole*

In the manner given in Example 13, 4-ethyl-2,3-bis-p-hydroxyphenyl)indole was reacted with 2-diethylamino-ethyl chloride diluted with xylene in a 1:1 ratio, in the presence of lithium butyl, to give 4-ethyl-2,3-bis[p-[2-(diethylamino)ethoxy]phenyl]indole.

EXAMPLE 44

*4-ethyl-2,3-bis[p-[3-(dimethylamino)propoxy]phenyl]-indole*

In the manner given in Example 13, 4-ethyl-2,3-bis(p-hydroxyphenyl)indole was reacted with 3-dimethylamino-propyl chloride diluted with xylene in a 1:1 ratio, in the presence of potassium hydride, to give 4-ethyl-2,3-bis[p-[3-(dimethylamino)propoxy]phenyl]indole.

EXAMPLE 45

*1-methyl-2,3-bis[p[2-(dimethylamino)ethoxy]-phenyl]indole*

In the manner given in Example 13, 1-methyl-2,3-bis-(p-hydroxyphenyl)indole was reacted with 2-diethyl-aminoethyl chloride diluted with xylene in a 1:1 ratio, in the presence of sodium hydride, to give 1-methyl-2,3-bis-[p-[2-(diethylamino)ethoxy]phenyl]indole.

EXAMPLE 46

*1,5-dimethyl-2,3-bis[p-[2-(diethylamino)ethoxy]phenyl]-indole*

In the manner given in Example 13, 1,5-dimethyl-2,3-bis(p-hydroxyphenyl)indole was reacted with 2-diethyl-aminoethyl chloride diluted with xylene in a 1:1 ratio, in the presence of sodium hydride, to give 1,5-dimethyl-2,3-bis[p-[2-diethylamino)ethoxy]phenyl]indole.

EXAMPLE 47

*1-methyl-5-chloro-2,3-bis[p-[2-(dimethylamino)ethoxy]-phenyl]indole*

In the manner given in Example 13, 1-methyl-5-chloro-2,3-bis(p-hydroxyphenyl)indole was reacted with 2-dimethylaminoethyl chloride diluted with xylene in a 1:1 ratio, in the presence of triphenylmethyl sodium, to give 1-methyl-5-chloro-2,3-bis[p-[2-(dimethylamino)-ethoxy]phenyl]indole.

EXAMPLE 48

*1-formyl-2,3-bis[p-[2-(diethylamino)ethoxy]phenyl]-indole*

In the manner given in Example 13, 1-formyl-2,3-bis-(p-hydroxyphenyl)indole was reacted with 2-dimethyl-aminoethyl chloride diluted with xylene in a 1:1 ratio, in the presence of sodium hydride, to give 1-formyl-2,3-bis-[p-[2-(diethylamino)ethoxy]phenyl]indole.

EXAMPLE 49

*1-formyl-5-methyl-2,3-bis[p-[3-(piperidino)propoxy]-phenyl]indole*

In the manner given in Example 13, 1-formyl-5-methyl-2,3-bis(p-hydroxyphenyl)indole was reacted with 3-piperidinopropyl chloride diluted with xylene in a 1:1 ratio, in the presence of sodium hydride, to give 1-formyl-5-methyl-2,3-bis[p-[3-(piperidino)propoxy]phenyl]indole.

EXAMPLE 50

*1-acetyl-5-methyl-2,3-bis[p-[2-(diethylamino)ethoxy] phenyl]indole*

In the manner given in Example 13, 1-acetyl-5-methyl-2,3-bis(p-hydroxyphenyl)indole was reacted with 2-diethylaminoethyl chloride diluted with xylene in a 1:1 ratio, in the presence of sodium hydride, to give 1-acetyl-5-methyl-2,3-bis[p-[2-(diethylamino)ethoxy]phenyl]indole.

EXAMPLE 51

*5-bromo-2,3-bis[p-[3-(pyrrolidino)propoxy]phenyl]indole*

In the manner given in Example 13, 5-bromo-2,3-bis(p-hydroxyphenyl)indole was reacted with 3-pyrrolidinopropyl chloride diluted with xylene in a 1:1 ratio, in the presence of sodium hydride, to give 5-bromo-2,3-bis[p-[3-(pyrrolidino)propoxy]phenyl]indole.

EXAMPLE 52

*7-iodo-2,3-bis[p-[3-(diethylamino)propoxy] phenyl]indole*

In the manner given in Example 13, 7-iodo-2,3-bis(p-hydroxyphenyl)indole was reacted with 3-diethyl-aminopropyl chloride diluted with xylene in a 1:1 ratio, in the presence of sodium hydride, to give 7-iodo-2,3-bis[p-[3-(diethylamino)propoxy]phenyl]indole.

EXAMPLE 53

*1-propionyl-2,3-bis[p-[2-(dipropylamino)ethoxy] phenyl]indole*

In the manner given in Example 13, 1-propionyl-2,3-bis(p-hydroxyphenyl)indole was reacted with 2-dipropnyl-aminoethyl chloride diluted with xylene in a 1:1 ratio, in the presence of sodium hydride, to give 1-propionyl-2,3-bis[p-[2-(dipropylamino)ethoxy]phenyl]indole.

EXAMPLE 54

*1-butyryl-2,3-bis[p-[2-(diethylamino)ethoxy] phenyl]indole*

In the manner given in Example 13, 1-butyryl-2,3-bis(p-hydroxyphenyl)indole was reacted with 2-diethyl-aminoethyl chloride diluted with xylene in a 1:1 ratio, in the presence of potassium triphenylmethyl, to give 1-butyryl-2,3-bis[p-[2-(diethylamino)ethoxy]phenyl]indole.

EXAMPLE 55

*5-methoxy-2,3-bis[p-[2-(diethylamino)ethoxy] phenyl]indole*

In the manner given in Example 13, 5-methoxy-2,3-bis(p-hydroxyphenyl)indole was reacted with 2-diethyl-aminoethyl chloride diluted with xylene in a 1:1 ratio, in the presence of sodium hydride to give 5-methoxy-2,3-bis[p-[2-(diethylamino)ethoxy]phenyl]indole.

EXAMPLE 56

*5-ethoxy-2,3-bis[p-[2-(diethylamino)ethoxy] phenyl]indole*

In the manner given in Example 13, 5-ethoxy-2,3-bis(p-hydroxyphenyl)indole was reacted with 2-diethyl-amino chloride diluted with xylene in a 1:1 ratio, in the presence of sodium hydride, to give 5-ethoxy-2,3-bis[p-[2-(diethylamino)ethoxy]phenyl]indole.

EXAMPLE 57

*5-propoxy-2,3-bis[p-[2-(diethylamino)ethoxy] phenyl]indole*

In the manner given in Example 13, 5-propoxy-2,3-bis(p-hydroxyphenyl)indole was reacted with 2-diethyl-aminoethyl chloride diluted with xylene in a 1:1 ratio, in the presence of sodium hydride, to give 5-propoxy-2,3-bis[p-[2-(diethylamino)ethoxy]phenyl]indole.

EXAMPLE 58

*4-methoxy-2,3-bis[p-[3-(diethylamino)propoxy] phenyl]indole*

In the manner given in Example 13, 4-methoxy-2,3-bis(p-hydroxyphenyl)indole was reacted with 3-dimethyl-aminopropyl chloride diluted with xylene in a 1:1 ratio, in the presence of sodium hydride, to give 4-methoxy-2,3-bis[p-[3-(dimethylamino)propoxy]phenyl]indole.

EXAMPLE 59

*6-methoxy-2,3-bis[p-[2-(dipropylamino)ethoxy] phenyl]indole*

In the manner given in Example 13, 6-methoxy-2,3-bis(p-hydroxyphenyl)indole was reacted with 2-dipropyl-aminoethyl chloride diluted with xylene in a 1:1 ratio, in the presence of sodium hydride, to give 6-methoxy-2,3-bis[p-[2-(dipropylamino)ethoxy]phenyl]indole.

EXAMPLE 60

*4-ethoxy-2,3-bis[p-[2-(diethylamino)ethoxy] phenyl]indole*

In the manner given in Example 13, 4-ethoxy-2,3-bis (p-hydroxyphenyl)indole was reacted with 2-diethylaminoethyl chloride diluted with xylene in a 1:1 ratio, in the presence of sodium hydride, to give 4-ethoxy-2,3-bis[p - [2 - (diethylamino)ethoxy]phenyl]indole.

EXAMPLE 61

*6-propoxy-2,3-bis[p-[3-(piperidino)propoxy] phenyl]indole*

In the mannner given in Example 13, 6-propoxy-2,3-bis(p-hydroxyphenyl)indole was reacted with 3-piperidinopropyl chloride diluted with xylene in a 1:1 ratio, in the presence of sodium hydride, to give 6-propoxy-2,3-bis[p-[3-(piperidino)propoxy]phenyl]indole.

EXAMPLE 62

*1-methyl-2,3-bis[p-[2-(diisopropylamino)ethoxy] phenyl]indole*

In the manner given in Example 13, 1-methyl-2,3-bis(p-hydroxyphenyl)indole was reacted with 2-diisopropylaminoethyl chloride diluted with xylene in a 1:1 ratio, in the presence of sodium hydride, to give 1-methyl-2,3-bis [p-[2-diisopropylamino)ethoxy]phenyl]indole.

EXAMPLE 63

*2,3-bis[p-[2-(2-methylpiperidino)ethoxy]phenyl]indole*

In the manner given in Example 13, 2,3-bis(p-hydroxyphenyl)indole was reacted with 2-(2-methylpiperidino) ethyl chloride diluted with xylene in a 1:1 ratio, in the presence of sodium hydride, to give 2,3-bis[p-[2-(2-methylpiperidino)ethoxy]phenyl]indole.

EXAMPLE 64

*1-acetyl-5-methoxy-2,3-bis[p-[2-(diethylamino)ethoxy] phenyl]indole*

In the manner given in Example 9, 5-methoxy-2,3-bis [p-[2-(diethylamino)ethoxy]phenyl]indole in dimethylformamide, under a nitrogen atmosphere, was first treated with sodium hydride and then with acetyl chloride to give 1 - acetyl-5-methoxy-2,3-bis[p-[2-(diethylamino)ethoxy]-phenyl]indole.

EXAMPLE 65

*1-propionyl-5-methoxy-2,3-bis[p-[2-(diethylamino) ethoxy]phenyl]indole*

In the manner given in Example 9, 5-methoxy-2,3-bis [p-[2-(diethylamino)ethoxy]phenyl]indole is dimethylformamide, under a nitrogen atmosphere, was first treated with sodium hydride and then with propionyl chloride to give 1 - propionyl-5-methoxy-2,3-bis[p-[2-(diethylamino) ethoxy]phenyl]indole.

EXAMPLE 66

*1-butyryl-5-ethoxy-2,3-bis[p-[2-(diethylamino)ethoxy] phenyl]indole*

In the manner given in Example 9, 5-ethoxy-2,3-bis[p-[2-(diethylamino)ethoxy]phenyl]indole in dimethylformamide, under a nitrogen atmosphere, was first treated with sodium hydride and then with butyryl chloride to give 1 - butyryl - 5 - ethoxy-2,3-bis[p-[2-diethylamino) ethoxy]phenyl]indole.

EXAMPLE 67

*1-propionyl-5-propoxy-2(3-bis[p-[2-(diethylamino) ethoxy]phenyl]indole*

In the manner given in Example 9, 5-propoxy-2,3-bis[p-[2-(diethylamino)ethoxy]phenyl]indole in dimethylformamide, under a nitrogen atmosphere, was first treated with sodium hydride and then with propionyl chloride to give 1 - propionyl-5-propoxy-2,3-bis[p-[2-(diethylamino) ethoxy]phenyl]indole.

EXAMPLE 68

*1-acetyl-4-methoxy-2,3-bis[p-[3-(dimethylamino) propoxy]phenyl]indole*

In the manner given in Example 9, 4-methoxy-2,3-bis[p-[3-(dimethylamino)propoxy]phenyl]indole in dimethylformamide, under a nitrogen atmosphere, was first treated with sodium hydride and then with acetyl chloride to give 1-acetyl-4-methoxy-2,3-bis[p-[3-(dimethylamino) propoxy]phenyl]indole.

EXAMPLE 69

*1-acetyl-6-methoxy-2,3-bis[p-[2-(dipropylamino)ethoxy] phenyl]indole*

In the manner given in Example 9, 6-methoxy-2,3-bis[p - [2 - (dipropylamino)ethoxy]phenyl]indole in dimethylformamide, under a nitrogen atmosphere, was first treated with sodium hydride and then with acetyl chloride to give 1-acetyl-6-methoxy-2,3-bis[p-[2-(dipropylamino) amino)ethoxy]phenyl]indole.

EXAMPLE 70

*1-formyl-5-ethoxy-2,3-bis[p-[2-(diethylamino)ethoxy] phenyl]indole*

In the manner given in Example 11, 5-ethoxy-2,3-bis[p-[2-(diethylamino)ethoxy]phenyl]indole was treated at first with methylmagnesium iodide and then with ethyl formate to give 1-formyl-5-ethoxy-2,3-bis[p-[2-(diethylamino)ethoxy]phenyl]indole.

In the same manner given in the examples, other 2,3-bis[p - [ω - aminoalkoxy]phenyl]indoles are prepared by reacting a correspondingly substituted 2,3-bis(-p-hydroxyphenyl)indole with a selected N-substituted ω-aminoalkyl chloride or bromide in the presence of a base. Compounds thus obtained include:

5-isopropyl-2,3-bis[p-[2-(diethylamino)ethoxy]phenyl] indole;
5-iodo-2,3-bis[p-[2-(diethylamino)ethoxy]phenyl] indole;
4-bromo-2,3-bis[p-[2-(diethylamino)ethoxy]phenyl) indole;
1-acetyl-2,3-bis[p-[2-(diethylamino)ethoxy]phenyl] indole;
1-isobutyryl-2,3-bis[p-[2-(diethylamino)ethoxy]phenyl] indole;
1-acetyl-5-fluoro[2,3-bis[p-[2-(diethylamino)ethoxyl] phenyl]indole;
1-formyl-5-fluoro-2,3-bis[2-(diethylamino)ethoxy] phenyl]indole;
5-chloro-2,3-bis[p-[3-(dimethylamino)propoxy] phenyl]indole;
7-bromo-2,3-bis[p-[3-(dimethylamino)propoxy]phenyl] indole;
4-fluoro-2,3-bis[p-[3-dimethylamino)propoxy]phenyl] indole;
6-chloro-2,3-bis[p-[3-(dimethylamino)propoxy]phenyl] indole;
1-butyryl-2,3-bis[p-[3-(dimethylamino)propoxy]phenyl] indole;
5-methoxy-2,3-bis[p-[3-(dimethylamino)propoxy] phenyl]indole;
1,7-dimethyl-2,3-bis[p-[3-(dimethylamino)propoxy] phenyl]indole;
1-acetyl-7-fluoro-2,3-bis[p-[3-(dimethylamino)propoxy] phenyl]indole;
4-fluoro-2,3-bis[p-[2-(pyrrolidino)ethoxy]phenyl] indole;
6-fluoro-2,3-bis[p-[2-(pyrrolidino)ethoxy]phenyl] indole;
4-chloro-2,3-bis[p-[2-(pyrrolidino)ethoxy]phenyl] indole;
4-iodo-2,3-bis[p-[2-(pyrrolidino)ethoxy]phenyl]indole;
1-propionyl-2,3-bis[p-[2-(pyrrolidino)ethoxy]phenyl] indole;
6-ethoxy-2,3-bis[p-[2-(pyrrolidino)ethoxy]phenyl] indole;
1-formyl-7-methyl-2,3-bis[p-[2-(pyrrolidino)ethoxy] phenyl]indole;

1-formyl-7-fluoro-2,3-bis[p-[2-(pyrrolidino)ethoxy]
phenyl]indole;
6-bromo-2,3-bis[p-[3-(dipropylamino)propoxy]phenyl]
indole;
1-propionyl-2,3-bis[p-[3-(diethylamino)propoxy]phenyl]
indole;
1-butyryl-2,3-bis[p-[3-(dimethylamino)propoxy]phenyl]
indole;
1-acetyl-5-fluoro-2,3-bis[p-[3-(diethylamino)propoxy]
phenyl]indole;
1-formyl-7-fluoro-2,3-bis[p-[3-(dipropylamino)propoxy]
phenyl]indole;
1-methyl-5-chloro-2,3-bis[p-[3-(dimethylamino)propoxy]
phenyl]indole;
1-methyl-5-fluoro-2,3-bis[p-[3-(piperidino)propoxy]
phenyl]indole;
1-methyl-7-fluoro-2,3-bis[p-[3-(piperidino)propoxy]
phenyl]indole;
5-propoxy-2,3-bis[p-[3-(piperidino)propoxy]phenyl]
indole;
5-ethoxy-2,3-bis[p-[3-(piperidino)propoxy]phenyl]
indole;
2,3-bis[p-[2-(2,2-dimethylpyrrolidino)ethoxy]phenyl]
indole;
1-formyl-2,3-bis[p-[2-(3-ethylpyrrolidino)ethoxy]phenyl]
indole;
1-ethyl-2,3-bis[p-[3-(2-propylpiperidino)propoxy]
phenyl]indole;
2,3-bis[p-[2-(3-isopropylpiperidino)ethoxy]phenyl]
indole;
1-acetyl-6-methoxy-2,3-bis[p-[3-(dimethylamino)
propoxy]phenyl]indole;
1-butyryl-4-methoxy-2,3-bis[p-[2-(dimethylamino)
ethoxy]phenyl]indole;
1-propionyl-7-ethoxy-2,3-bis[p-[3-(diethylamino)
propoxy]phenyl]indole;
1-formyl-5-propoxy-2,3-bis[p-[2-(diethylamino)ethoxy]
phenyl]indole;
1-acetyl-6-propoxy-2,3-bis[p-[2,2-dimethylpyrrolidino)
ethoxy]phenyl]indole;
and the like.

I claim:
1. 2,3-bis[p-(ω-aminoalkoxy)phenyl]indole of the formula:

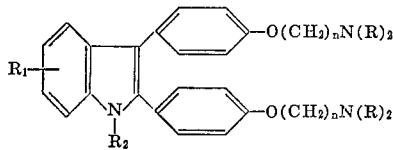

wherein $R_1$ is selected from the group consisting of hydrogen, fluorine, chlorine, bromine, iodine, alkyl having from 1 to 3 carbon atoms, inclusive, and alkoxy having from 1 to 3 carbon atoms, inclusive; wherein $R_2$ is selected from the group consisting of hydrogen, methyl, formyl and

in which the alkyl group has from 1 to 3 carbon atoms, inclusive, wherein $n$ is selected from the group of numbers consisting of 2 and 3; wherein the radical —N(R)$_2$ is selected from the group consisting of dialkylamino, in which the alkyl groups have from 1 to 3 carbon atoms, inclusive, pyrrolidino, piperidino, alkylpyrrolidino, alkylpiperidino, dialkylpyrrolidino, and dialkylpiperidino, in which the alkyl groups have from 1 to 3 carbon atoms, inclusive, and the acid addition salts thereof.

2. 2,3-bis[p-[2-(diethylamino)ethoxy]phenyl]indole.
3. A compound according to claim 1, wherein $R_1$ is 7-methyl, $R_2$ is hydrogen, $n$ is 2 and —N(R)$_2$ is diethylamino, and the compound is therefore 7-methyl-2,3-bis[p-[2-(diethylamino)ethoxy]phenyl]indole.
4. A compound according to claim 1, wherein $R_1$ is 7-ethyl, $R_2$ is hydrogen, $n$ is 3, and —N(R)$_2$ is dipropylamino, and the compound is therefore 7-ethyl-2,3-bis[p-[3-(dipropylamino)propoxy]phenyl]indole.
5. A compound according to claim 1, wherein $R_1$ is 5-fluoro, $R_2$ is hydrogen, $n$ is 3, and —N(R)$_2$ is piperidino, and the compound is therefore 5-fluoro-2,3-bis[p-[3-(piperidino)propoxy]phenyl]indole.

References Cited

UNITED STATES PATENTS 2,606,190   8/1952   Shelton et al. _____ 260—294.7
2,768,207   10/1956  Cheney et al. _____ 260—570

OTHER REFERENCES

Wagner et al.: Synthetic Organic Chemistry, Wiley and Sons, New York (1953), p. 171.

JAMES A. PATTEN, *Primary Examiner.*

U.S. Cl. X.R.

260—326.15, 295.5, 293.4, 294, 326.16; 252—402; 71—96; 424—232, 267, 274

UNITED STATES PATENT OFFICE
CERTIFICATE OF CORRECTION

Patent No. 3,420,838   January 7, 196

Jacob Szmuszkovicz

It is certified that error appears in the above identified patent and that said Letters Patent are hereby corrected as shown below:

Column 1, formula I should appear as shown below:

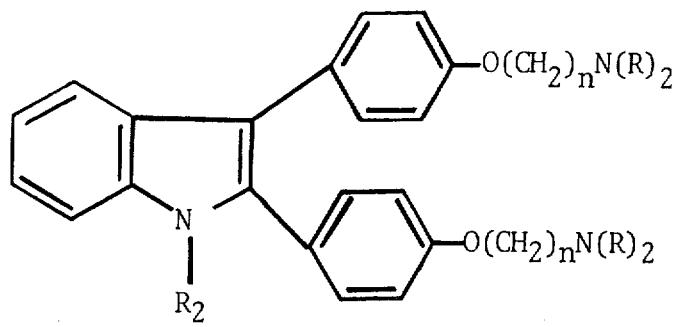

Column 2, line 19, "alkll" should read -- alkyl --; line 48, "$R_2$-hydrog should read -- $R_2$=hydrogen --. Column 3, formula V should appe as shown below:

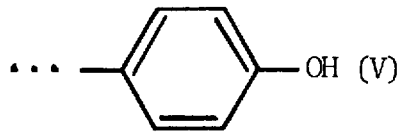

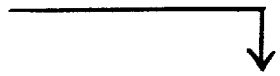

Column 6, line 11, beginning with "and 6-ethoxy-" cancel all to and including "from the com-" in line 23, same column 6, and insert the following:

> and 6-methoxy-2,3-bis(p-hydroxyphenyl)indole.
> In the same manner as shown above, 4-ethoxy-2,3-bis(p-hydroxyphenyl)indole and 6-ethoxy-2,3-bis(p-hydroxyphenyl)indole; and 4-propoxy-2,3-bis(p-hydroxyphenyl)indole and 6-propoxy-2,3-bis(p-hydroxy)indole are prepared by substituting m-ethoxyphenylhydrazine hydrochloride and m-propoxyphenylhydrazine hydrochloride, respectively, for m-methoxyphenylhydrazine hydrochloride.

3,420,838

(2)

In the same manner as shown above, 1-methyl-4-methoxy-2,3-bis(p-hydroxyphenyl)indole and 1-methyl-6-methoxy-2,3-bis(p-hydroxyphenyl)indole are prepared by substituting 1-methyl-1-(m-methoxyphenyl)hydrazine hydrochloride for m-methoxyphenylhydrazine hydrochloride.

Column 9, line 55, "2,3-bis(methoxy" should read -- 2,3-bis(p-methoxy --. Column 14, line 24, "ethoxy]ethoxy]phenyl-" should read -- ethoxy]phenyl] --; line 40, "propoxyl]" should read -- propoxy] --; line 43, "dimethylamino" should read -- diethylamino --. Column 15, line 5, "dimethylamino should read -- diethylamino --; line 21, "[2-diethylamino" should read -- [2-(diethylamino --. Column 17, line 46, "is" should read -- in --; line 63, "5-propoxy-2(3-" should read -- 5-propoxy-2,3-bis --. Column 18 line 16, "amino)ethoxy]" should read -- ethoxy] --; line 43, "ethoxyl]" should read -- ethoxy] --; line 45, "2,3-bis[2-" should read -- 2,3-bis[p-[2- --.

Signed and sealed this 2nd day of June 1970.

(SEAL)
Attest:

EDWARD M. FLETCHER, JR.
Attesting Officer

WILLIAM E. SCHUYLER,
Commissioner of Patent